United States Patent [19]

Kincaid

[11] 4,063,609
[45] Dec. 20, 1977

[54] FOUR WHEEL DRIVE POWER TRAIN

[76] Inventor: Elmo Kincaid, 1660 Ashley Drive, Clarkston, Wash. 99403

[21] Appl. No.: 626,634

[22] Filed: Oct. 29, 1975

[51] Int. Cl.$^2$ .............................................. B60K 17/16
[52] U.S. Cl. .................................... 180/70 R; 74/650; 74/230.17 M; 180/49
[58] Field of Search ..................... 180/44 R, 49, 70 R; 74/650, 665 GE, 722, 230.17 M

[56] References Cited

U.S. PATENT DOCUMENTS

| | | | |
|---|---|---|---|
| 1,314,093 | 8/1919 | Pifer | 180/44 R |
| 1,765,268 | 6/1930 | Hathaway | 74/722 X |
| 1,828,841 | 10/1931 | Kingsley | 180/44 R |
| 2,754,691 | 7/1956 | May | 74/722 |
| 2,927,480 | 3/1960 | Schweickart | 74/650 |
| 2,989,125 | 6/1961 | Hoppenworth | 74/665 GE X |
| 3,037,394 | 6/1962 | Watkins | 74/230.17 B |
| 3,057,217 | 10/1962 | Stibitz | 74/230.17 M |
| 3,331,464 | 7/1967 | Van Doorne | 180/44 R |
| 3,580,350 | 5/1971 | Arkus-Duntov | 180/44 R |
| 3,650,349 | 3/1972 | Cleveland | 180/44 R |

Primary Examiner—Joseph F. Peters, Jr.
Assistant Examiner—John P. Silverstrim
Attorney, Agent, or Firm—Chernoff & Vilhauer

[57] ABSTRACT

A power train having an internal differential for transferring power to four driven wheels of vehicles having an integral combustion engine, a transmission, and paired front and rear wheels comprises a first pulley drive system to interengage the internal combustion engine and the transmission, an equalizer comprising a plurality of split pulley sheaves slideably joined to a shaft which is mounted rotatably transversely of the vehicle, a second pulley drive system to interengage the transmission and the equalizer, and drive V-belts interengaging the sheaves and the wheels. The pulley sheaves self adjust longitudinally along the shaft to vary the distance between sheave halves to set the effective diameter of belts driving slower and faster wheels thus allowing all wheels to be driven without slippage of the belts. A belt tightener automatically maintains uniform tension in all of the belts.

2 Claims, 10 Drawing Figures

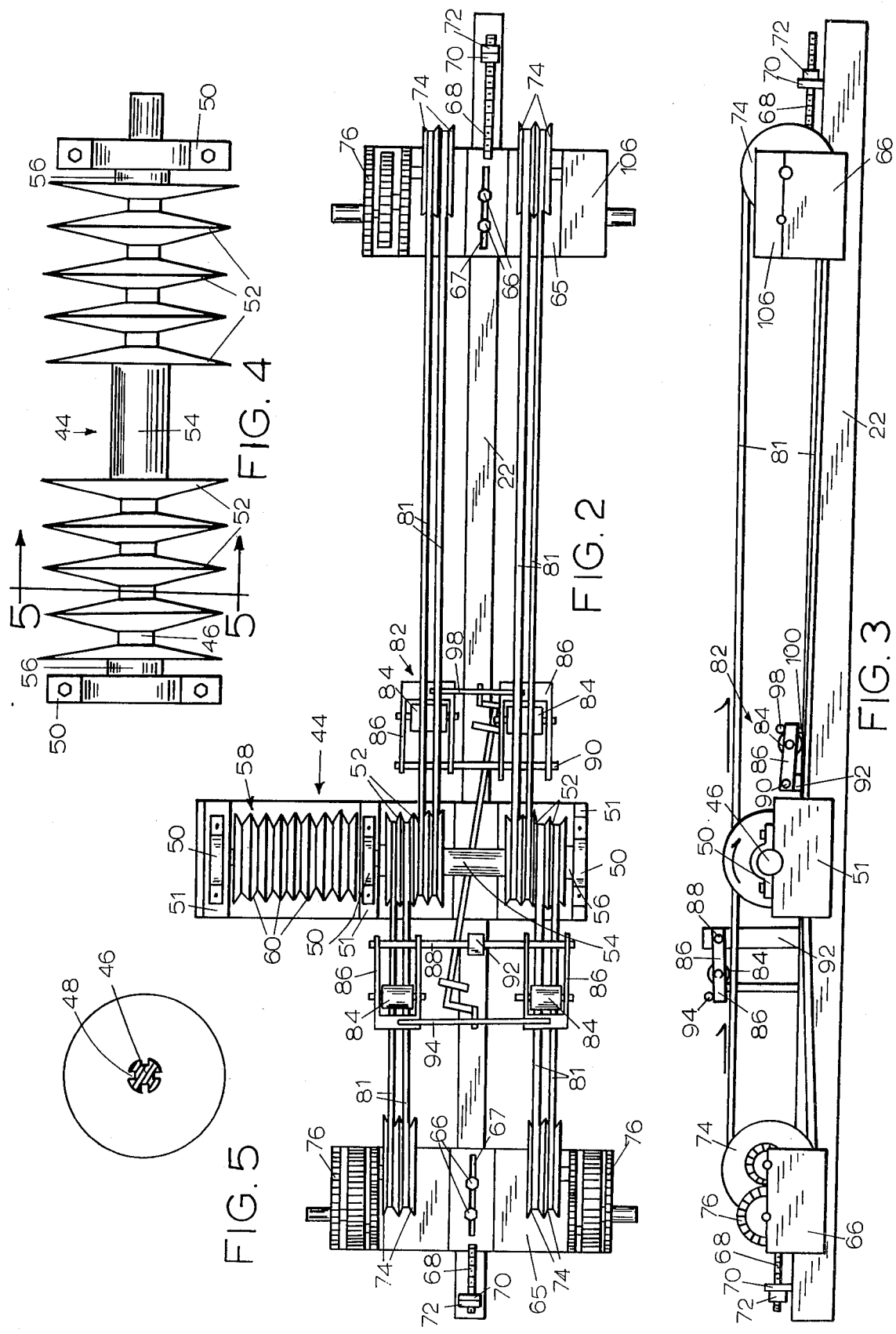

FOUR WHEEL DRIVE POWER TRAIN

BACKGROUND OF THE INVENTION

This invention relates to a four wheel drive power train and in particular to such a power train having an internal belt driven differential.

Normal planetary gear-type differentials are not commonly used in four wheel drive vehicles as the slippage allowed thereby destroys the effectiveness gained by four wheel drive. Four wheel drive vehicles of the prior art have generally avoided this problem by not utilizing any differential when in the four wheel drive mode. The vehicles are thus limited to low speed driving and large turning ratios.

The advent of the limited slip gear type differential has eliminated this problem, but only at the expense of greatly added costs. Even in vehicles so equipped it is common to remove the power train from the four wheel drive mode during normal highway operation.

Accordingly, the general object of the present invention is to provide a four wheel drive power train having an integral belt driven differential.

Another object of the present invention is to provide a four wheel drive power train wherein the differential accommodates both front and rear wheels.

THE DRAWINGS

The manner in which the foregoing and other objects of the invention are accomplished will be apparent from the accompanying specification and claims, considered together with the drawings wherein:

FIG. 2 is a diagrammatic plan view showing the power train of the present invention;

FIG. 3 is a diagrammatic side elevation view of the power train;

FIG. 4 is a detailed view showing the equalizer of the power train of FIG. 2;

FIG. 5 is a cross-sectional view taken on the line 5—5 of FIG. 4;

GENERAL STATEMENT OF THE INVENTION

The present invention generally provides a four wheel drive power train for use on a vehicle having an internal combustion engine, a transmission, and paired front and rear wheels. The power train comprises first drive means interengaging the internal combustion engine and the transmission, an equalizer including a plurality of self positioning split pulley sheaves slideably joined to a shaft which is mounted rotatably transverse of the vehicle, second drive means interengaging the transmission and the equalizer, and drive V-belts interengaging each wheel with the equalizer sheaves.

DETAILED DESCRIPTION OF A PREFERRED EMBODIMENT

Figure 1:
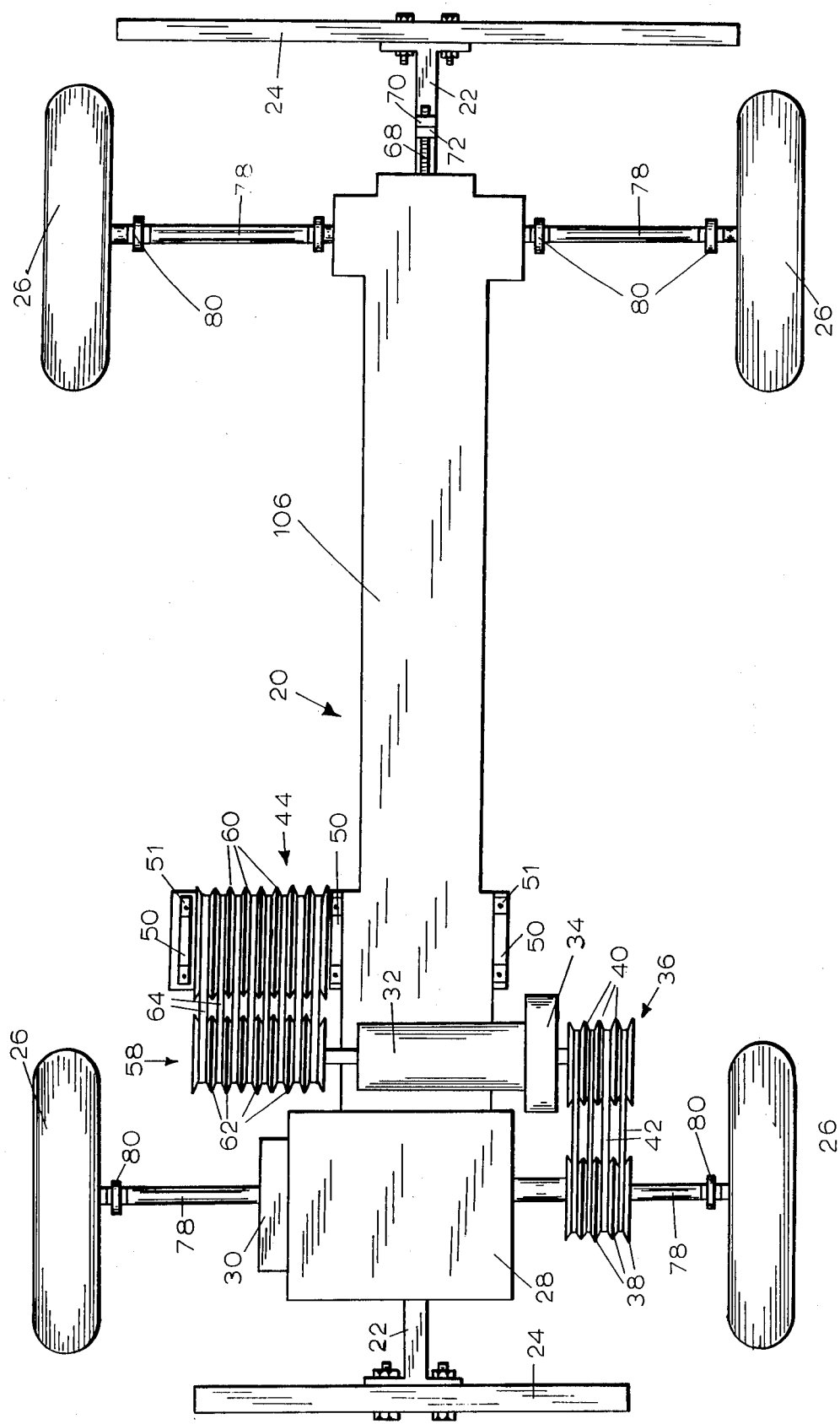
FIG. 1 is a diagrammatic plan view of a portion of a vehicle showing the installation of the power train of the present invention.

Referring to FIG. 1 the power train of the present invention is shown on a vehicle 20 having a central support frame 22, front and rear cross frames 24, and paired front and rear wheels 26. The vehicle is powered by an internal combustion engine 28 shown in the preferred embodiment as air cooled with a cooling blower 30 located at the forward end. The engine is mounted transversely in the forward portion of the vehicle. A transmission 32 having a torque converter 34 located at one end is located behind the engine. The transmission also is shown as being located transversely in the vehicle.

First drive means 36 interengages the engine and the transmission. The first drive means comprises a plurality of engine V-belt pulleys 38 joined to the drive shaft of the engine. A like number of transmission input V-belt pulleys 40 are mounted on the input shaft of the torque converter. The transmission input pulleys are aligned with the engine pulleys and first V-belts 42 interengage them.

Referring to FIGS. 3 and 4, equalizer 44 is driven by the transmission to transfer power to the wheels. The equalizer includes shaft 46 having longitudinal grooves positioned at four symmetrical radial locations to provide a spline 48, FIG. 5. Bearings 50 rotatably join the shaft transversely to the frame. Supports 51 attach the bearing to the frame. Preferably three such bearings are provided, one centrally located on the shaft, and one at each end. The shaft is located off-center above the center support frame. The equalizer is divided into a differential portion, which is located on the centered portion of the shaft, and a drive portion, which is located on the off-centered portion of the shaft. The centrally located bearing separates the two portions of the shaft.

The differential portion of the equalizer comprises a plurality of split pulley sheaves 52 having an internal spline to communicate with the shaft. The sheaves generally are slideable freely longitudinally along the shaft, however the bearings limit their movement to the differential portion of the shaft. The sheaves are arranged in sets containing a right hand and a left hand sheave. In the embodiment illustrated eight such sets are utilized; two such sets being used to drive each wheel. The sets are grouped with four of the sets deployed on one side of the differential portion of shaft 46 and four sets deployed on the other side.

Spacer 54 divides the groups. The spacer is joined on its ends to the two medial sheaves. The outer sheaves on both ends of the shaft are joined to end blocks 56 which are fixed to the shaft. The end blocks provide adjustment means (not shown) to adjust the end sheaves longitudinally along the shaft.

The sets of sheaves therefore can be separated or moved together in order to vary the width of the groove therebetween. As a set of the sheaves is separated, the belt drops in the larger width groove effectively to provide a smaller diameter pulley; as the set is moved closer together the belt raises in the smaller width groove effectively to provide a larger diameter pulley. The amount of separation is limited, however, by the position of the end blocks. Thus when certain sets of the sheaves are separated, other sets must be moved closer together.

Second drive means 58 interengages the transmission and the equalizer. It contains a plurality of equalizer V-belt pulleys 60 joined to the drive portion of shaft 46. A like number of transmission output V-belt pulleys 62 are mounted on the output shaft of transmission 32 and aligned with the equalizer pulleys. Second V-belts 64 interengages the transmission pulleys and equalizer pulleys to power the equalizer.

Each pair of wheels 26 is mounted on a frame support 65 located transversely the vehicle at each end of the central support frame 22. Bolts 66 fit through slots 67 positioned in the frame supports to engage the central frame support. Thus the locations of the support frames are adjustable longitudinally relative the vehicle.

Threaded rods 68 extend rearwardly from joinder to the rear support frame and forwardly from joinder to the forward support frame allowing positioning of the support frames. Eyes 70 join the central support frame to allow the threaded rods to pass therethrough. Nuts 72 are received adjustably on the ends of the threaded rods to engage the eyes. Movement of the nuts on the threaded rods thus positions the support frames.

V-belt drive pulleys 74 are carried rotatably on each end of the support frames. The pulleys drive gear reduction units 76. Axles 78 interengage each gear reduction unit with a wheel. Universals 80 interface the axles with the gear reduction unit and the wheels. Bearings (not shown) rotatably support the wheels on the vehicle. Drive V-belts 81 interengage the V-belt drive pulleys and the sets of sheaves on the equalizer to power the vehicle.

Belt tightener 82, FIGS. 6, 7, 8 and 9, maintains equal tension in the belts as the effective pulley diameter of some of the belts change during operation of the power train. The belt tightener includes a plurality of rollers 84, one roller positioned to engage the V-drive belts which drive each wheel. Referring to FIG. 2, if the equalizer rotates clockwise the rollers engaging the V-drive belts which drive the front wheels are positioned above the upper portion of the belts; the rollers engaging the V-drive belts which drive the rear wheels are positioned above the lower portion of the belts. Thus the rollers engage the belts as they travel toward the equalizer to assure the engagement of the belt in the equalizer sheaves. If the vehicle is driven in reverse the tighteners are of less effect, however high speed driving in reverse is seldom, if ever, encountered.

The rollers are mounted rotatably on frames 86. One end of the forward frames is joined to forward shaft 88 and one end of the rearward frames is joined to rearward shaft 90. The shafts are pivotally mounted on support posts 92 to allow movement of the frames between a raised and a lowered position.

Forward linkage bar 94 pivotally interconnects the other ends of the forward frames to each other. Forward linkage post 96 depends from pivotal engagement with the medial portion of the forward linkage bar.

Rearward linkage bar 98 pivotally interconnects the other ends of the rearward frames to each other. Rearward linkage post 100 depends from pivotal engagement with the medial portion of the rearward linkage bar.

Thus upward movement or downward movement of either linkage post simultaneously moves both frames connected to the associated linkage bar to their raised or lowered position respectively. Pivoting of either linkage bar about its linkage post places one of the frames associated therewith in its raised or lowered position and places the other frame in the opposite position.

Crank 102 is joined pivotally to central support frame 22 by bearings 104. The crank interengages the lower portion of the linkage posts in a manner such that rotation of the crank raises or lowers the linkage posts to place all of the frames in their raised or lowered position. Locking means 105 locks the crank in variable rotational positions.

Cover plates 106 cover the power train to keep it dry and prevent damage by foreign objects.

OPERATION

The manner of use of the herein described power train is as follows:

End blocks 56 are adjusted on shaft 46 of the equalizer to properly space the pulley sheaves 52. The pulley sheaves should be positioned such that all of the drive V-belts are located radially at the midpoints of the pulleys to allow equal diametric change in either direction. Once set the end blocks need only be adjusted when wear causes the belts to become thinner.

Frame supports 65 are adjusted manually by means of threaded rods 68 and nuts 72 to properly tension the belts. This adjustment should be performed with all of the pairs of sheaves equally spaced on equalizer 44. Once the frame supports are adjusted, they remain in the same position until such times as the belts wear or stretch.

The vehicle is operated much as normal. Power is transmitted from internal combustion engine 28 to transmission 32 by first drive means 36. Second drive means 58 transmits the power from the transmission to the equalizer 44. The use of V-belts for the drive means provides a low cost linkage which is compatable in wear and load transmission capabilities with equalizer disclosed hereinbefore.

Power is transmitted from the equalizer to each wheel by drive V-belts 81. It will be noted that all four wheels of the vehicle are driven resulting in increased traction in snow, ice or mire conditions. Unlike geared four-wheel drive vehicles, however, the wheels may be driven at differing speeds to facilitate cornering of the vehicle.

As the speed of one or more wheels is increased, the paired sheaves associated with that wheel will come together causing the belts driving that wheel to raise to a larger effective diameter to accommodate the increased speed. Conversely, the remaining pairs of sheaves separate causing the belts driven thereby to drop to a smaller effective diameter.

When the conditions necessitating differential wheel speeds terminate, the paired sheaves will automatically equalize to drive all of the wheels at a common speed.

When one or more of the belts is lowered in the paired sheaves to an effective lowered diameter, it also will become slack. Belt tightener 82 overcomes this problem automatically to maintain the belts at a constant tension during operation of the vehicle.

Crank 102 is rotated to tension properly all of the drive V-belts when they are in a straight driving position. The locking means 105 locks the crank in this position.

When the vehicle negotiates a turn, the outside wheels will speed up driving the outside drive V-belts to a larger effective diameter and the inside drive V-belts to a smaller effective diameter. Rollers 84 which contact the outside belts are forced downward by the outside drive V-belts rotating associated frames 86 to their lowered position.

Forward linkage bar 94 and rearward linkage bar 98 are pivoted to move the opposite frames to their raised position thus causing their associated rollers to take up the slack of the inside drive V-belts.

When the vehicle completes turning the rollers are automatically equalized to place equal tension on all of the belts.

Figure 10:
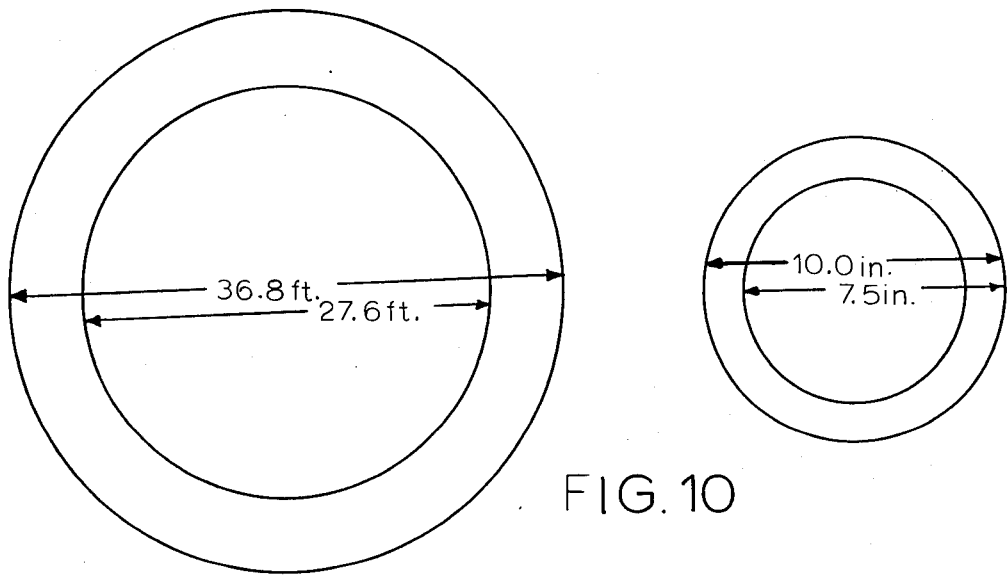
FIG. 10 is a diagram showing the effective turning ratio of a typical vehicle employing the power train of the present invention.
Figure 8:
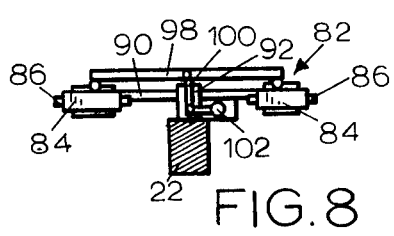
FIG. 8 is a cross-sectional view taken on the line 8—8 of FIG. 7.
Figure 9:
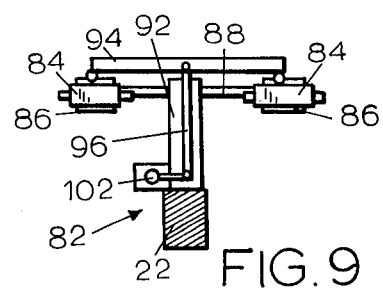
FIG. 9 is a cross-sectional view taken on the line 9—9 of FIG. 7.
Figure 7:
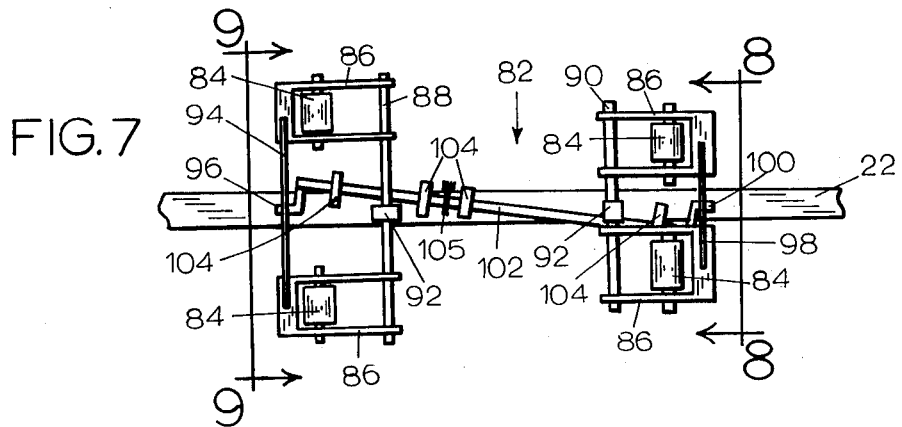
FIG. 7 is a diagrammatic detailed view, in plan, of the belt tightener of FIG. 6.
Figure 6:
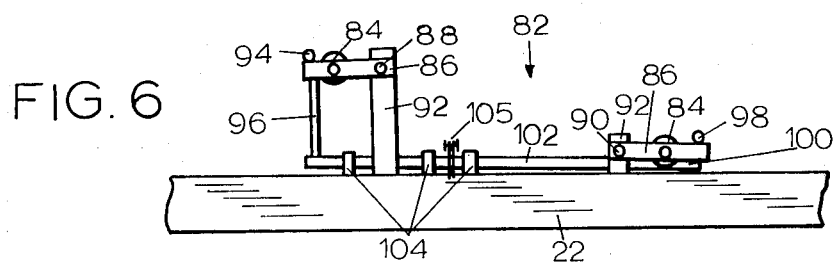
FIG. 6 is a diagrammatic detailed view, in side elevation, showing the belt tightener of the power train of FIG. 2.

FIG. 10 shows the effective turning radius obtained with a typical ratio of effective belt diameters. If the effective diameter of the drive V-belt varies from 7.5 inches to 10 inches, the circumferential ratio is 0.75. This would correspond to a vehicle having an inner wheel turning circle of 27.6 and an outer wheel turning circle of 36.8. A turning circle of this size is typical for a modern narrow track automobile.

Having thus described my invention in a preferred embodiment, I claim:

1. A four-wheel drive power train for use on a vehicle having an engine, a transmission driven by said engine, a front pair of wheels, and a rear pair of wheels, one of said pairs of wheels being articulated for steering, said power train comprising:

a shaft rotatably mounted transversely of said vehicle, means drivingly interconnecting said shaft to said transmission; at least four sets of split pulley sheave halves mounted on said shaft for rotation therewith and longitudinal slideability therealong, each of said sets containing a right hand sheave half and a left hand sheave half; at least four V-belt drive pulleys, each one of said pulleys being drivingly connected to only one of said wheels; at least four drive V-belts, each of said belts interengaging only one of said pulleys with only one of said sets of sheave halves; and means for limiting the longitudinal extent of said slideability of said sheave halves along said shaft such that separation of the halves of one of said sets causes convergence of the halves of the others of said sets whereby each of said wheels is driven differentially of every other one of said wheels.

2. The power train of claim 1 including a belt tightener to maintain uniform tightness in each of the drive V-belts comprising:
 a. a plurality of rollers one engaging the drive V-belts associated with each of said wheels;
 b. frames rotatably supporting each said roller;
 c. a forward shaft joined to said frames which are supporting the rollers which engage the drive V-belts driving the front wheels;
 d. a rearward shaft joined to said frames which are supporting the rollers which engage the drive V-belts driving the rear wheels;
 e. said forward shaft and rearward shaft being pivotally mounted on support posts to allow said frames to pivot between a raised and lowered position;
 f. a forward linkage bar pivotally interengaging the frames which are mounted on said forward shaft, such that when one of said frames is pivoted to its raised position the other of said frames is pivoted to its lowered position;
 g. a forward lingage post pivotally joined to the medial portion of said forward linkage bar configured to move said forward linkage bar and thus the frames associated therewith between their raised and powered positions;
 h. a rearward linkage bar pivotally interengaging the frames which are mounted on the rearward shaft such that when one of said frames is pivoted to a raised position, the other of said frames is pivoted to a lowered position;
 i. a rearward linkage post pivotally joined to the medial portion of said rearward linkage bar configured to move said rearward linkage bar and thus the frames associated therewith between their raised and lowered positions;
 j. a crank rotatably mounted intermediate its ends to interengage said forward linkage post and said rearward linkage post to simultaneously move said forward and rearward linkage post between their raised and lowered positions; and
 k. locking means to lock said crank in variable rotational positions.

* * * * *